United States Patent
Jung et al.

(10) Patent No.: US 12,228,423 B2
(45) Date of Patent: Feb. 18, 2025

(54) METHOD FOR GENERATING A MAP DISPLAY FOR VEHICLES

(71) Applicant: Robert Bosch GmbH, Stuttgart (DE)

(72) Inventors: Michael Jung, Embrach (CH); Timo Nachstedt, Benningen (DE); Tobias Strauss, Obersulm (DE); Vladimir Gerts, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 227 days.

(21) Appl. No.: 18/045,221

(22) Filed: Oct. 10, 2022

(65) Prior Publication Data

US 2023/0126766 A1    Apr. 27, 2023

(30) Foreign Application Priority Data

Oct. 25, 2021  (DE) .................... 10 2021 211 988.3

(51) Int. Cl.
*G01C 21/00* (2006.01)
*G06F 18/2413* (2023.01)

(52) U.S. Cl.
CPC ..... *G01C 21/3848* (2020.08); *G01C 21/3819* (2020.08); *G01C 21/3867* (2020.08); *G06F 18/24147* (2023.01)

(58) Field of Classification Search
CPC .................................................. G01C 21/3848
See application file for complete search history.

(56) References Cited

U.S. PATENT DOCUMENTS

| | | | | |
|---|---|---|---|---|
| 10,773,719 | B2* | 9/2020 | Heidenreich | G01C 21/30 |
| 11,256,729 | B2* | 2/2022 | Eade | G06F 16/284 |
| 11,512,964 | B2* | 11/2022 | Chen | G01C 21/32 |
| 11,851,069 | B2* | 12/2023 | Knoeppel | B60W 40/12 |
| 2008/0033645 | A1 | 2/2008 | Levinson et al. | |
| 2022/0290991 | A1* | 9/2022 | Liebner | G01C 21/3804 |
| 2022/0398825 | A1* | 12/2022 | Gao | G06V 10/464 |

FOREIGN PATENT DOCUMENTS

| | | |
|---|---|---|
| DE | 102013208521 A1 | 11/2014 |
| DE | 102015214338 A1 | 2/2017 |
| DE | 102019123538 A1 | 3/2021 |
| DE | 102019216722 A1 | 5/2021 |

\* cited by examiner

*Primary Examiner* — Michael A Berns
(74) *Attorney, Agent, or Firm* — NORTON ROSE FULBRIGHT US LLP; Gerard A. Messina (57) ABSTRACT

A method for generating a map display for vehicles. The method includes receiving vehicle sensor data; ascertaining poses of the vehicles based on the vehicle sensor data; generating subsets of the plurality of poses by combining poses of drives that have been carried out on an identical subsection of the route, a course of the respective subsection of the route being described by the vehicle sensor data assigned to the poses of every subset; generating sub-segments of the map display based on the subsets of the poses, for each subset a sub-segment being generated, and a course of the traffic lane within a sub-segment corresponding to one of the subsets being ascertained based on the poses of a subset; interpreting the sub-segments as nodes of a graph display of the map display and connecting sub-segments via edges of the graph display.

11 Claims, 6 Drawing Sheets

METHOD FOR GENERATING A MAP DISPLAY FOR VEHICLES

CROSS REFERENCE

The present application claims the benefit under 35 U.S.C. § 119 of German Patent Application No. DE 10 2021 211 988.3 filed on Oct. 25, 2021, which is expressly incorporated herein in its entirety.

FIELD

The present invention relates to a method for generating a map display for vehicles.

BACKGROUND INFORMATION

In the implementation of future assisted and automatic driving functions, maps and the data relating to the environment contained therein play a decisive role, since they are able to solve central problems regarding the online perception of the vehicle sensor system. Examples thereof are the limited sensor range, concealment of relevant pieces of information, limited computing power in the vehicle and short observation intervals. In order to benefit from the map data in these cases, an exact localization of the vehicle relative to the map is required. For this purpose, a specific localization map in turn is required, which contains data that may be used for locating the vehicle. The related art for generating maps, for example, from fleet data, involves methods that are based on graph optimization. These methods are referred to in the literature as graph SLAM, SLAM standing for Simultaneous Localization and Mapping. In these methods, the vehicle pose (position and orientation) relative to a series of points in time is explicitly modeled in each drive.

Each modeled point in time corresponds in this case to a node in the graph on which the optimization is based. The nodes of consecutive points in time of the same drive are connected by so-called odometry edges, which represent the relative shift of the corresponding poses derived from the vehicle sensor system. Different drives on the same roads are then aligned to one another by optimizing the vehicle poses in such a way that landmarks that have been observed by the sensor system of the vehicles during the different drives are superimposed. For this purpose, edges are inserted between nodes in the graph on which the optimization is based when identical landmarks have been observed. These edges, referred to as correspondence edges, contain pieces of information as to how the poses assigned to the connected nodes must be shifted relative to one another in order to optimally superimpose the landmarks. In the methods from the related art, in particular, the consideration of landmarks, are, however complex and require high computing power.

SUMMARY

It is an object of the present invention to provide an improved method for generating a map display for vehicles.

This object may be achieved by the method for generating a map display for vehicles according to features of the present invention. Advantageous embodiments of the present invention are disclosed herein.

According to one aspect of the present invention, a method is provided for generating a map display for vehicles, including: receiving vehicle sensor data, the vehicle sensor data being recorded during a plurality of drives of a vehicle or of a plurality of vehicles, the plurality of drives extending at least partially along an identical route, and the vehicle sensor data of a vehicle including odometry data of a vehicle odometry and surroundings sensor data of the vehicle;

ascertaining poses of the vehicles based on the vehicle sensor data, each ascertained pose of a vehicle being assigned in each case to one of the plurality of drives and describing a position and orientation of the vehicle on the route negotiated by the vehicle during the drive;

generating subsets of the plurality of poses by combining poses of drives that have been carried out on an identical subsection of the route, a course of the respective subsection of the route being described by the vehicle sensor data assigned to the poses of every subset;

generating sub-segments of the map display based on the subsets of the poses, one sub-segment being generated for each subset, and a course of the traffic lane within one of the sub-segments corresponding to the subsets being ascertained based on the poses of every subset;

interpreting the sub-segments as nodes of a graph display of the map display and connecting sub-segments via edges to the graph display in such a way that subsets connected via an edge are based in each case on poses of a drive.

This may yield the technical advantage that an improved method for generating a map display for vehicles may be provided. For this purpose, poses of the vehicles along the driven routes are ascertained based on sensor data of the vehicles for a plurality of drives of a vehicle or of a plurality of vehicles. By grouping the poses in connected subsets, sub-segments of the map display are generated, the poses of a subset describing in each case a course of the route within the respective sub-segment of the map display. The generated sub-segments are further interpreted as nodes of a graph display of the map display and connected to one another via edges, a cohesive course of the route being generated by the connection of sub-segments. Using the graph display of the map display, it is possible to enable a narrow orientation to the optimization method from the related art for graph optimization for merging fleet data during the mapping of road networks, such as the Graph SLAM method from the related art. In addition, the graph representation of the map display allows for an efficient updating of selected road segments by being able to individually update individual segments of the map display based on the graph representation, without requiring as a result an entire updating of the complete map display. In addition, it is possible using the graph representation to minimize the volume of data to be conveyed from a map server to a vehicle for the purpose of displaying a map in the vehicle. In addition, the selection of landmarks in the map display is made possible, which are observable with respect to an instantaneous orientation and position of the vehicle.

According to one specific example embodiment of the present invention, the generation of the subsets includes:

generating hyperedges based on the plurality of poses, each hyperedge representing a set of poses of a plurality of drives, each hyperedge of each drive including a maximum of one pose, and each pose of a hyperedge having a distance to each further pose of the hyperedge, which is shorter than a predefined maximum distance; and combining a plurality of poses of the plurality of drives to form a subset based on the hyperedges, for all poses of a first hyperedge and of a second hyperedge of the subset situated in the driving direction of the drives of the poses of the subset behind the first hyperedge, it is the case that:

for each pose of the second hyperedge, it is the case that:
no pose situated directly immediately in front of the respective pose of the second hyperedge on the same drive in the driving direction is encompassed by a hyperedge of the subset; or a pose situated immediately in front of the respective pose of the second hyperedge on the same drive in the driving direction is encompassed by the first hyperedge; and for each pose of the first hyperedge, it is the case that:
no pose situated immediately behind the respective pose of the first hyperedge on the same drive in the driving direction is encompassed by a hyperedge of the subset; or a pose situated immediately behind the respective pose of the first hyperedge on the same drive in the driving direction is encompassed by the second hyperedge.

This may yield the technical advantage that a precise segmentation of the map display into sub-segments and a graph representation of the map display based thereon are made possible. With the presented segmentation, it is possible, in particular, to minimize or fully avoid the consideration of landmarks. For this purpose, the segmentation, in particular, the generation of subsets of the plurality of poses is carried out based exclusively on Euclidean distances of individual poses to one another. For this purpose, hyperedges of the poses are generated based on the plurality of ascertained poses. Within the context of the application, a hyperedge in this case is a set of poses. The poses of a hyperedge include in this case a distance between one another, which is shorter than a predefined maximum distance. Taking the generated hyperedges into account, the poses are combined in the generated subsets in such a way that for each pose of two hyperedges situated behind one another in the driving direction of the drives, it is the case that a pose situated immediately in front of or immediately behind the respective pose is either not situated in any further hyperedge, or is situated in the respectively immediately preceding or following hyperedge. Using the subsets defined in this manner, it is possible to combine only poses to form a subset, which are associated with the course of a shared route. In the case of a road course including branches, in which different traffic lanes are continued in partially different driving directions, for example, at an intersection or at an exit on an expressway, the courses of the different traffic lanes may, following the aforementioned conditions for the segmentation of the poses into subsets, be represented in various subsets and, in particular, in various sub-segments of the map display. In this way, a precise segmentation may be achieved based solely on the Euclidean distances of different poses of a plurality of drives of a vehicle or of a plurality of vehicles.

According to one specific example embodiment of the present invention, the generation of hyperedges includes:
carrying out a radius search starting from a pose of a drive; determining poses of the plurality of drives, which have a distance shorter than a predetermined maximum distance to the initial pose;
removing poses having a distance shorter than the predetermined maximum distance to the initial pose, which have a yaw angle that deviates more sharply from a yaw angle of the initial pose than a predetermined limiting value; and
removing poses of a drive, for which a pose is already determined having a shorter distance than the predetermined maximum distance and smaller yaw angle than the predetermined limiting value.

This may yield the technical advantage that a precise determination of hyperedges is able to be achieved based on the Euclidean distances of individual poses relative to one another. By removing poses that have a yaw angle which deviates more sharply from a yaw angle of the initial pose than a predetermined limiting value, it is possible to discard poses originating from drives that have been carried out along the same roadway but in a different or opposite direction. The presented determination of the distances of the individual poses relative to one another for generating the hyperedges represents a method, which is technically easy to carry out with a minimal computing effort.

According to one specific example embodiment of the present invention, the generation of hyperedges further includes:
if a pose is encompassed by multiple hyperedges,
merging the multiple hyperedges to form a merged hyperedge; and reducing the poses of the merged hyperedges, so that only one pose is encompassed by the merged hyperedge for each of the respective drives.

This may yield the technical advantage that an unambiguous assignment of poses to hyperedges is made possible. The unambiguous assignment makes a precise division of the poses into subsets possible and in connection therewith a precise partition of the map display into individual sub-segments.

According to one specific example embodiment of the present invention, the radius search is carried out for each pose of every drive.

This may yield the technical advantage that a precise determination of the hyperedges and in connection therewith a precise partitioning of the poses into subsets and in connection therewith a precise partitioning of the map display into sub-segments is made possible.

According to one specific example embodiment of the present invention, the radius search takes place by implementing a k-d tree.

This may yield the technical advantage that a reliable and rapid radius search is made possible.

According to one specific example embodiment of the present invention, the distance is a Euclidean distance.

This may yield the technical advantage that a distance determination is made possible, which is precise and easy to carry out.

According to one specific example embodiment of the present invention, the generation of subsets includes:
dividing subsets, which have a length that exceeds a predetermined maximum length, into a plurality of subsets, the length of a subset being provided by a Euclidean distance between an initial pose and a final pose of the subset along a driving direction of the drives of the poses of the subsets.

This may yield the technical advantage that excessively large sub-segments in the partitioning of the map display, which occur, for example, in conjunction with road courses extending straight over long route segments. Limiting the length of the individual sub-segments of the map display reduces the computing capacity required for showing the map display, in that only the immediately relevant sub-segment of the map display is able to be displayed. In addition, the volume of data to be transferred from the map server for display in the vehicle may be reduced by the smaller size of the sub-segments.

According to one specific example embodiment of the present invention, the connecting of sub-segments via edges may be carried out with the aid of a Union-Find data structure.

This may yield the technical advantage that a method is made possible for connecting the sub-segments via edges within the graph representation, which is precise and preferably easy to carry out.

According to one second aspect of the present invention, a processing unit is provided, which is configured to carry out the method for generating a map display for vehicles according to one of the above-described specific embodiments.

According to one third aspect of the present invention, a computer program product including commands is provided which, when the program is executed by a data processing unit, prompt the data processing unit to carry out the method for generating a map display for vehicles according to one of the above-described specific embodiments.

BRIEF DESCRIPTION OF THE DRAWINGS

Exemplary embodiments of the present invention are explained with reference to the figures.

DETAILED DESCRIPTION OF EXAMPLE EMBODIMENTS

Figure 1:
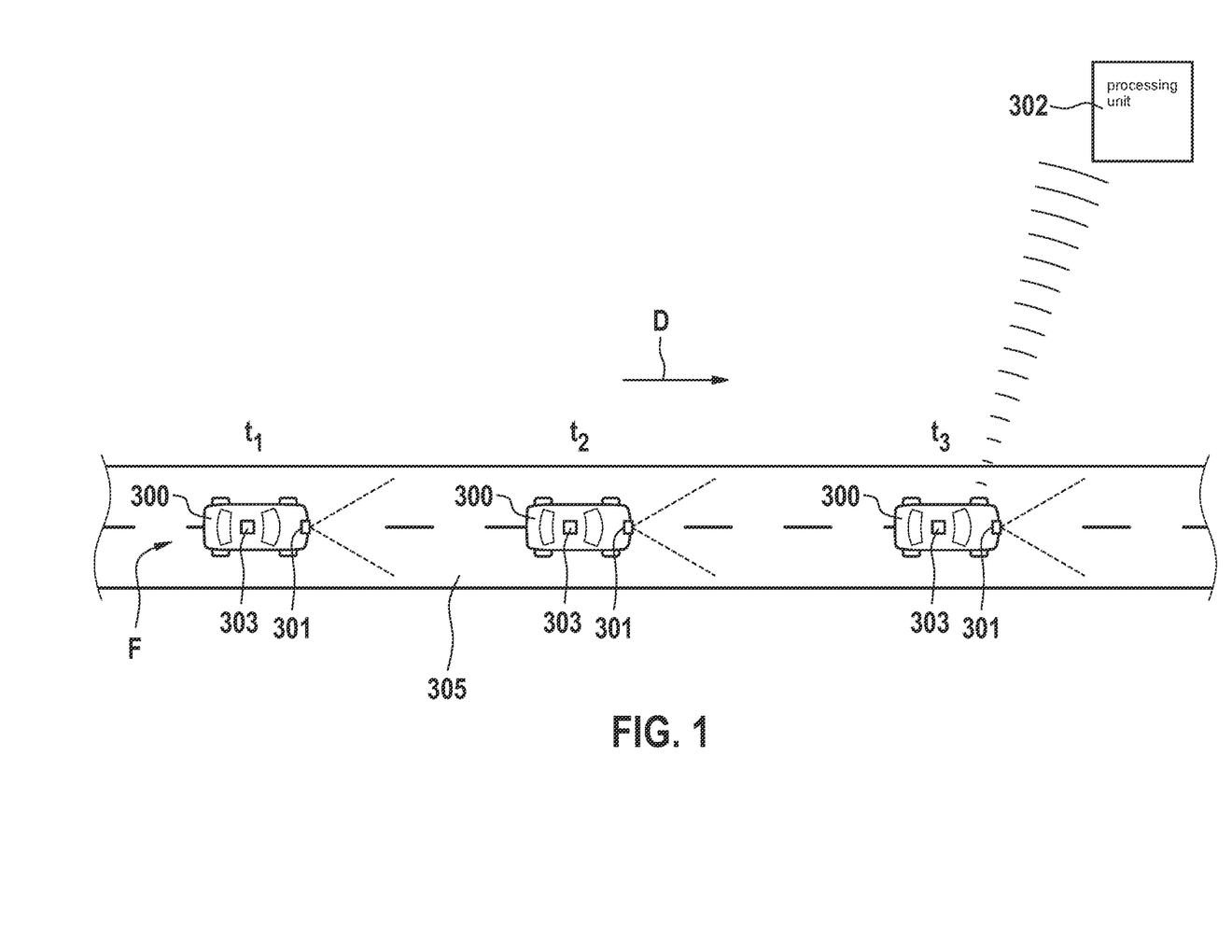
FIG. 1 schematically shows a representation of a vehicle negotiating a traffic lane.

FIG. 1 schematically shows a representation of a vehicle 300 negotiating a traffic lane 305.

FIG. 1 shows a vehicle 300, which is carrying out a drive F along a traffic lane 305 in a driving direction D. At various points in time t1, t2, t3, surroundings sensor data of a surroundings sensor 301 of surroundings of the vehicle are recorded by the vehicle. Surroundings sensor 301 may be designed, for example, as a LIDAR sensor, a radar sensor, a camera sensor or an arbitrary other surroundings sensor from the related art. An information retrieval with respect to the surroundings of vehicle 300 is made possible with the aid of the surroundings sensor data. In addition to the surroundings sensor data, odometry data of vehicle 300 are recorded by a vehicle odometry 303. These may include, for example, a yaw angle, a wheel rotation or other informative pieces of information for determining a vehicle condition of vehicle 300. The odometry data and the surroundings sensor data may be transferred via a data transfer to a processing unit 302. Processing unit 302 may be designed, for example, as a map server and may be configured to carry out the method according to the present invention for generating a map display. For this purpose, processing unit 302 is initially designed to calculate poses of the vehicle based on the surroundings sensor data and on the odometry data for the various points in time t1, t2, t3. The poses of vehicle 300 in this case describe a position and orientation of vehicle 300 relative to the surroundings of the vehicle and/or to traffic lane 305 negotiated by the vehicle. To carry out the method according to the present invention, odometry data and surroundings sensor data for an arbitrary number of drives F of a vehicle 300 or of a plurality of vehicles 300, which negotiate in each case traffic lane 305 or different traffic lanes 305, are recorded by the vehicle or by the different vehicles and provided for evaluation. For a detailed description of individual method steps of the method according to the present invention, reference is made to the description for FIGS. 2 and 3.

Figure 2:
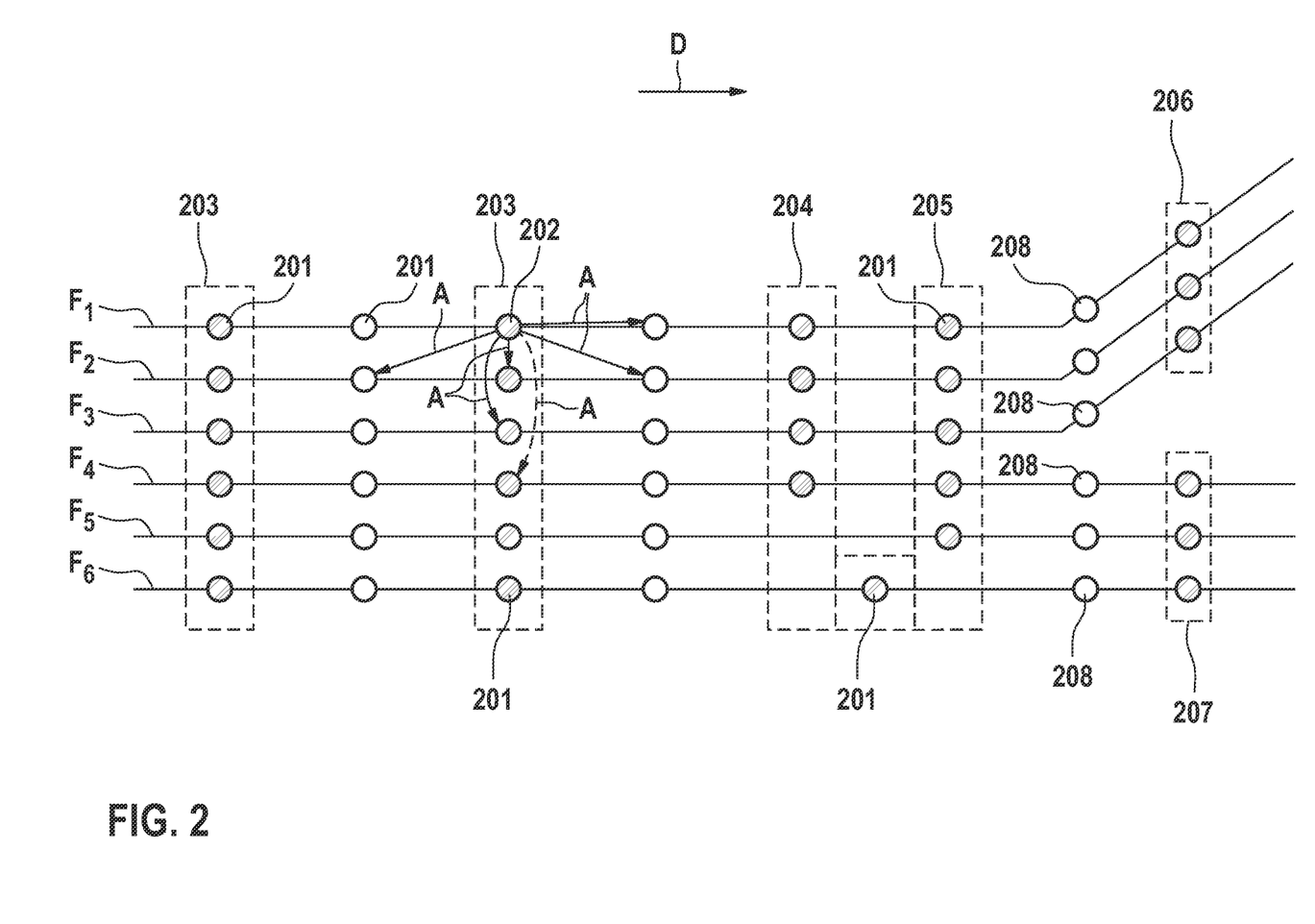
FIG. 2 schematically shows a representation of a plurality of poses of a plurality of drives, according to an example embodiment of the present invention.

FIG. 2 schematically shows a representation of a plurality of poses 201, 208 of a plurality of drives F1, F2, F3, F4, F5, F6.

FIG. 2 shows a plurality of poses 201, which are based on a plurality of surroundings sensor data and odometry data of at least one vehicle 300 for different drives F1, F2, F3, F4, F5, F6, which extend at least for one subsection along the same traffic lane 305. Drives F1, F2, F3, F4, F5, F6 in this case may have been carried out by a single vehicle 300 or by a plurality of vehicles 300. Similar to the description for FIG. 1, odometry data and surroundings sensor data are recorded by vehicle 300 or by vehicles 300 for different points in time.

Based on the odometry data and surroundings sensor data recorded for the different points in time, processing unit 302 is then able to calculate corresponding poses 201 of vehicle 300 or of vehicles 300 relative to the surroundings of vehicle 300 or relative to the negotiated traffic lane 305. The representation shown is purely schematic and the parallel arrangement or representation of drives F1, F2, F3, F4, F5, F6 is not intended to represent an absolute parallel course of the actual drives of vehicles 300 relative to one another. Drives F1, F2, F3, F4, F5, F6 represented in parallel represent, however, at least a partially parallel course of the actual drives of vehicles 300 and are interpreted in FIG. 2 and in FIG. 3 in such a way that respective drives F1, F2, F3, F4, F5, F6 have been carried out on the same traffic lane 305. Individual poses 201 in this case represent positions or orientations of vehicles 300 relative to different points in time on the respectively negotiated roadway or traffic lane 305. Drives F1, F2, F3, F4, F5, F6 in the representation in FIG. 2 may each have been carried out in driving direction D or in a driving direction opposite driving direction D.

To carry out method 100 according to the present invention for generating a map display 200 for vehicles 300, hyperedges 203 of poses 201 are initially calculated based on calculated poses 201. Hyperedges 203 represent in this case sets of poses 201, a maximum of one pose 201 being contained in each hyperedge 203 in each case per drive F1, F2, F3, F4, F5, F6. Hyperedges 203 are ascertained, starting from an initial pose 202, by ascertaining poses 201, which have a distance A to initial pose 202 that is shorter than a predetermined limiting value. Such a radius search is represented by way of example in FIG. 2 on pose 202 of drive F1. In contrast to the examples shown here, such radius searches may, however, be carried out as initial poses for all poses 201 of drives F1, F2, F3, F4, F5, F6.

Starting from determined distances A of different poses 201 to respective initial pose 202 of the implemented radius search, poses 201 are discarded, which have a minimal distance A to pose 202, which is also less in each case than the predetermined limiting value or maximum distance to initial pose 202. For ascertaining hyperedges 203, all poses 201 having a shorter distance A to initial pose 202 than the predefined maximum distance are discarded, for which a pose 201 of the same drive F1, F2, F3, F4, F5, F6 having a shorter distance A to initial pose 202 has already been ascertained. As represented in FIG. 2, all hyperedges 203 include in each case only one pose 201 per drive F1, F2, F3, F4, F5, F6. In addition, among ascertained poses 201 having a shorter distance A than the predefined maximum distance, those poses 201 are discarded, which have a yaw angle that deviates more sharply from a yaw angle of initial pose 202 than a predefined limiting value. In this way, those poses 201 may be discarded, which are based on drives F1, F2, F3, F4, F5, F6, which are carried out on the same traffic lane 305 but in the opposite direction.

The radius searches carried out in this way, which were able to be carried out for each pose 201 of drives F1, F2, F3, F4, F5, F6 as mentioned above, may be effectuated according to one specific embodiment by implementing a k-d tree in the form of a Next-Nearest-Neighbor search.

Distance A of individual poses 201 to respectively selected initial pose 202 may be determined in this case as a Euclidean distance.

Thus, hyperedges 203 determined according to the above-described radius searches starting from respectively selected initial poses 202 include for each drive F1, F2, F3, F4, F5, F6 a maximum of one pose 201, poses 201 of a hyperedge 203 each having maximally the predetermined maximum distance to one another. In the example in FIG. 2, a corresponding hyperedge 203 is calculated in each case only for every second pose 201 of a drive F1, F2, F3, F4, F5, F6 in driving direction D, which is represented in FIG. 2 by the dark executed circles. Poses 201 represented as empty circles, situated in each case between two calculated hyperedges 203, are not taken into account in the example shown for calculating hyperedges 203. Alternatively thereto, a corresponding hyperedge 203 may be calculated for each pose 201. Alternatively thereto, the method according to the present invention may also be carried out for greater distances, in which no hyperedges 203 are calculated for multiple consecutive poses 201 per drive F1, F2, F3, F4, F5, F6. For distances with long and straight extending route sections, in particular, the method according to the present invention may be accelerated and simplified by calculating the corresponding hyperedges 203 in a lower density and thus with a higher number of unconsidered poses 201 between the individually calculated hyperedges 203.

In the event that the execution of a radius search for initial poses 202 results in a pose 201 being contained in two hyperedges 204, 205, as is represented in FIG. 2 by pose 201 of drive F6, which is contained in hyperedges 204, 205, poses 201 of respective hyperedges 204, 205 are merged and a merged hyperedge 209 is generated, in which only one pose 201 per drive F1, F2, F3, F4, F5, F6, respectively, is contained, for respective poses 201 it further being the case that each pose 201 of merged hyperedge 209 has a distance A to the respective other poses 201, which is shorter than the predetermined maximum distance. A corresponding merged hyperedge 203 is represented by way of example in FIG. 3.

In the example shown in FIG. 2, drives F1, F2, F3, F4, F5, F6 of poses 201 extend in parallel. Starting from marked pose 208, however, drives F1 through F3 are at an angle to drive F4 through F6. This is intended to represent a branching of the traffic lanes negotiated by vehicles 300, which may occur, for example, at an intersection or at an exit on an expressway. The branching of drives F1 through F3 relative to drives F4 through F6 now results in a calculation of the hyperedges for poses 201 following poses 208 in driving direction D, that poses 201 of drives F1, F2, F3 are combined to form a hyperedge 206, whereas poses 201 of drives F4, F5, F6 are combined to form a further hyperedge 207, since due to the branching of parallel extending drives F1, F2, F3 relative to respective parallel extending drives F4, F5, F6, poses 201 of drives F4 through F6 have a greater distance A to poses 201 of drives F1, F2, F3 than the predetermined maximum distance. Poses 201 of hyperedge 206 and poses 201 of hyperedge 207 further meet the distance regulation and have between them a shorter distance A than the predetermined maximum distance.

Figure 3:
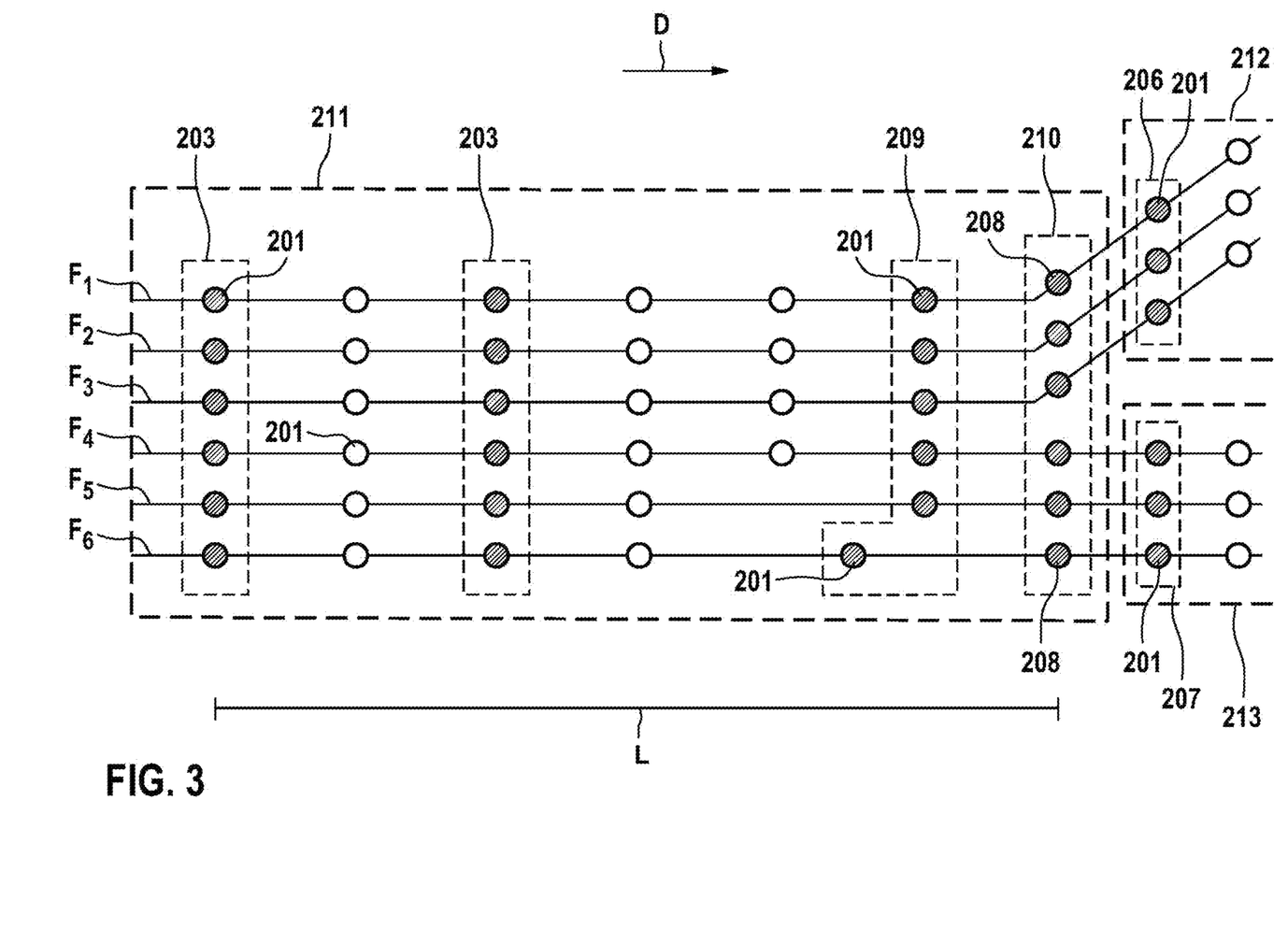
FIG. 3 schematically shows a further representation of a plurality of poses of a plurality of drives, according to an example embodiment of the present invention.

FIG. 3 schematically shows a further representation of a plurality of poses 201, 208 of a plurality of drives F1, F2, F3, F4, F5, F6.

FIG. 3 is based on the representation in FIG. 2 and includes all features described therein.

In contrast to FIG. 2, poses 208 are further combined in FIG. 3 to form a further hyperedge 210.

According to the present invention, to generate map display 200, poses 201 of the plurality of drives F1, F2, F3, F4, F5, F6 are divided into subsets 211, 212, 213 while taking previously calculated hyperedges 203 into account. Poses 201 of a shared subset 211, 212, 213 in this case describe drives F1, F2, F3, F4, F5, F6, which have been carried out on the same traffic lane 305.

Individual subsets 211, 212, 213 are ascertained in this case in such a way that poses 201 of a corresponding subset meet the following conditions.

The aforementioned conditions are described below with reference to poses 201 of hyperedge 209 and to poses 208 of hyperedge 210 of subset 211.

In one subset 211 including at least one first hyperedge 209 and one second hyperedge 210 situated in driving direction D behind first hyperedge 209, it is the case for each pose 201 of first hyperedge 209 that:

a pose of the same drive F1, F2, F3, F4, F5, F6 situated in driving direction D behind respective pose 201 is either not assigned to any hyperedge or is part of second hyperedge 210. Furthermore, it is the case for each pose 208 of second hyperedge 210 that:

a pose 201 situated in driving direction D immediately in front of pose 208 of second hyperedge 210 is either not assigned to any hyperedge or is part of first hyperedge 209.

As is shown in FIG. 3, the aforementioned conditions apply to all hyperedges 203, 209, 210 of subset 211. For first hyperedge 209, it is the case that for each pose 201 of hyperedge 209, the poses situated to the left of poses 201 of hyperedge 209 are not assigned to any hyperedge, whereas for each pose 201 of hyperedge 209, poses 208 following immediately to the right are fully encompassed by hyperedge 210. In contrast, for second hyperedge 210, it is the case that for all poses 208 of hyperedge 210, poses 201 situated immediately to the left are fully encompassed by first hyperedge 209.

In contrast, for poses 201 situated to the right of second hyperedge 210, the aforementioned conditions are not met. Instead, it is the case here that for poses 208 of drives F1, F2, F3 of second hyperedge 210 of subset 211, poses 201 situated immediately in driving direction D, thus, to the right of poses 208 are encompassed by hyperedge 206. In contrast, for poses 208 of drives F4, F5, F6 of second hyperedge 210, it is the case that poses 201 situated immediately in driving direction D behind poses 208 of drives F4, F5, F6 are situated in hyperedge 207. Thus, for poses 208 of second hyperedge 210, poses 201 immediately following in driving direction D are in fact situated in hyperedges, but in two different hyperedges 206, 207.

Following the above-described conditions for the combining in one of pose 201 in a subset 211, poses 201 of drives F1, F2, F3, which are situated following poses 208 of second hyperedge 210 in driving direction D, are not combined in subset 211 as are poses 201 situated ahead in driving direction D. The same applies to poses 201 of drives F4, F5, F6 following poses 208 in driving direction D, which are also not combined in subset 211 due to the violation of the above-described conditions. Instead, the aforementioned poses are combined in separate subsets 212, 213 starting from hyperedges 206, 207.

Subsets 211, 212, 213 generated in this way may further be limited in a length L of the respective subsets. Length L of a subset 211 in this case is provided via a Euclidean distance between a first pose 201 of subset 211 and a final pose 208 of the same drive F1, F2, F3, F4, F5, F6 of subset 211. Upon exceedance of length L of a subset 211 of a previously determined maximum length for subsets, the corresponding subsets may be divided into a plurality of subsets.

Figure 4:
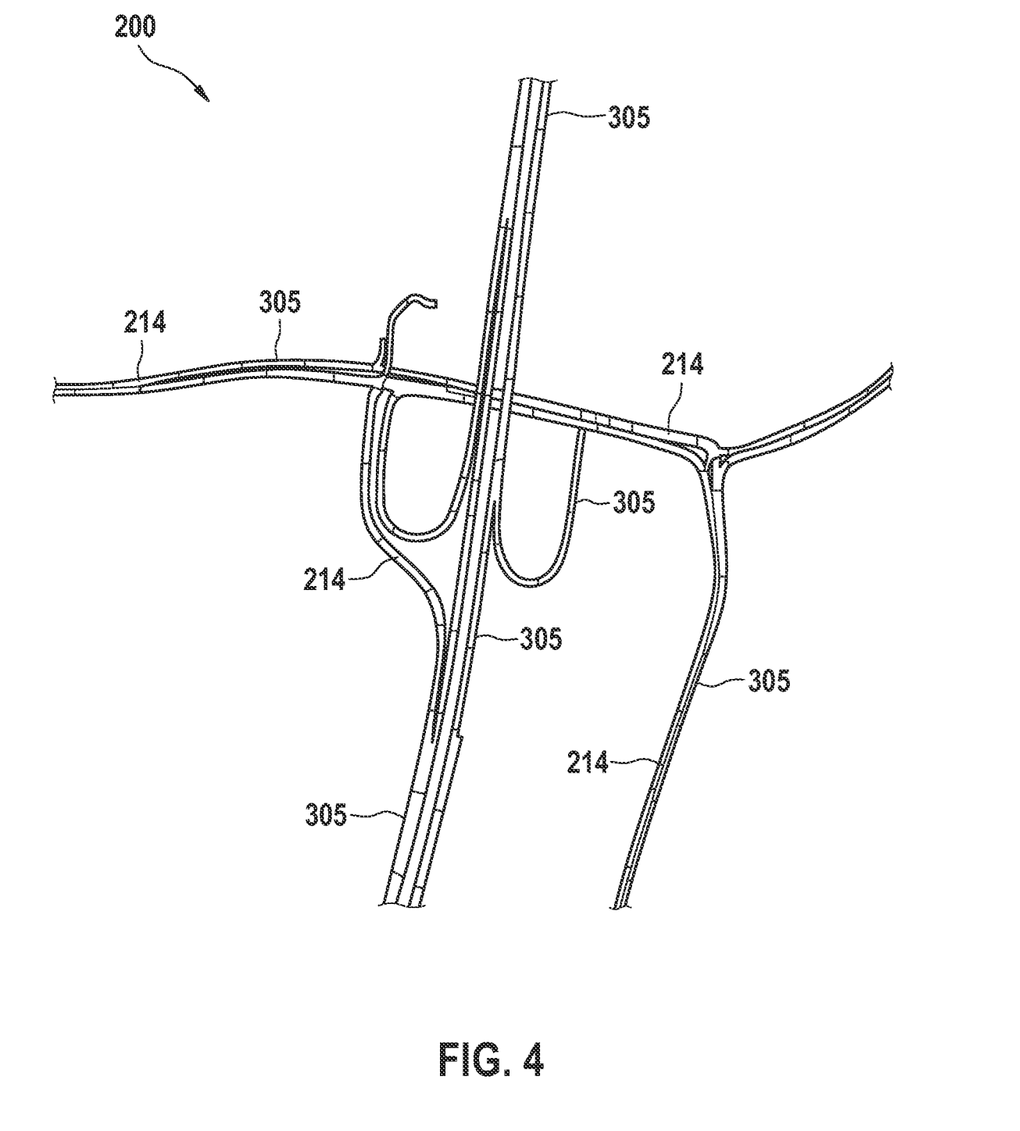
FIG. 4 schematically shows a representation of a map display, according to an example embodiment of the present invention.

Thus, using the above-described method, it is possible, following the road courses, to combine the respective poses in corresponding subsets 211, 212, 213. Respective subsets 211, 212, 212 in this case describe the respective sub-sections of the negotiated traffic lanes and are adapted accordingly to the corresponding road courses. When branching has occurred, as is represented in FIG. 3, the poses are combined in different subsets 211, 212, 213. In this way, it is possible to achieve a clearly structured partitioning of map display 200 based solely on the Euclidean distances of poses 201 of the different drives F1, F2, F3, F4, F5, F6, which corresponds to the individual road courses. Each subset 211, 212, 213 represented in FIG. 3 may be interpreted according to the present invention as a sub-segment 214 of map display 200. According to the present invention, sub-segments 214 of map display 200 ascertained in this way may be interpreted as nodes of a graph display of map display 200 and may be connected via edges of the graph display in such a way that sub-segments 214 connected to one another form a connected road course and thus include poses originating from a single drive. Such a map display 200 is represented in FIG. 4. The connection of individual sub-segments 214 via the edges of the graph display make it possible to call up individual sub-segments 214 for displaying the map display 200, two sub-segments 214 connected to one another via an edge being called up by a respective vehicle 300 in temporal succession during negotiation of the corresponding traffic lanes of sub-segments 214 and being displayed for representing map display 200.

FIG. 4 schematically shows a representation of a map display 200. Map display 200 shows a road network including a plurality of traffic lanes. Individual traffic lanes 305 are each divided into a plurality of sub-segments 214 of map display 200. Sub-segments 214 are based in this case on subsets 211, 212, 213 and on corresponding poses 201, 208 and describe sub-sections of traffic lanes 305 of map display 200.

According to the present invention, sub-segments 214 may each be interpreted as nodes of a graphic display of map display 200. The individual sub-segments could be connected in this context via corresponding edges of the graph display. Via the connection with the aid of edges, sub-segments 214 may be called up in succession when displaying map display 200, for example, in a vehicle 300, and for each called up sub-segment 214, the respectively following sub-segment 214 may be ascertained and accordingly called up based on the connection made by an edge of the sub-segment.

Figure 5:
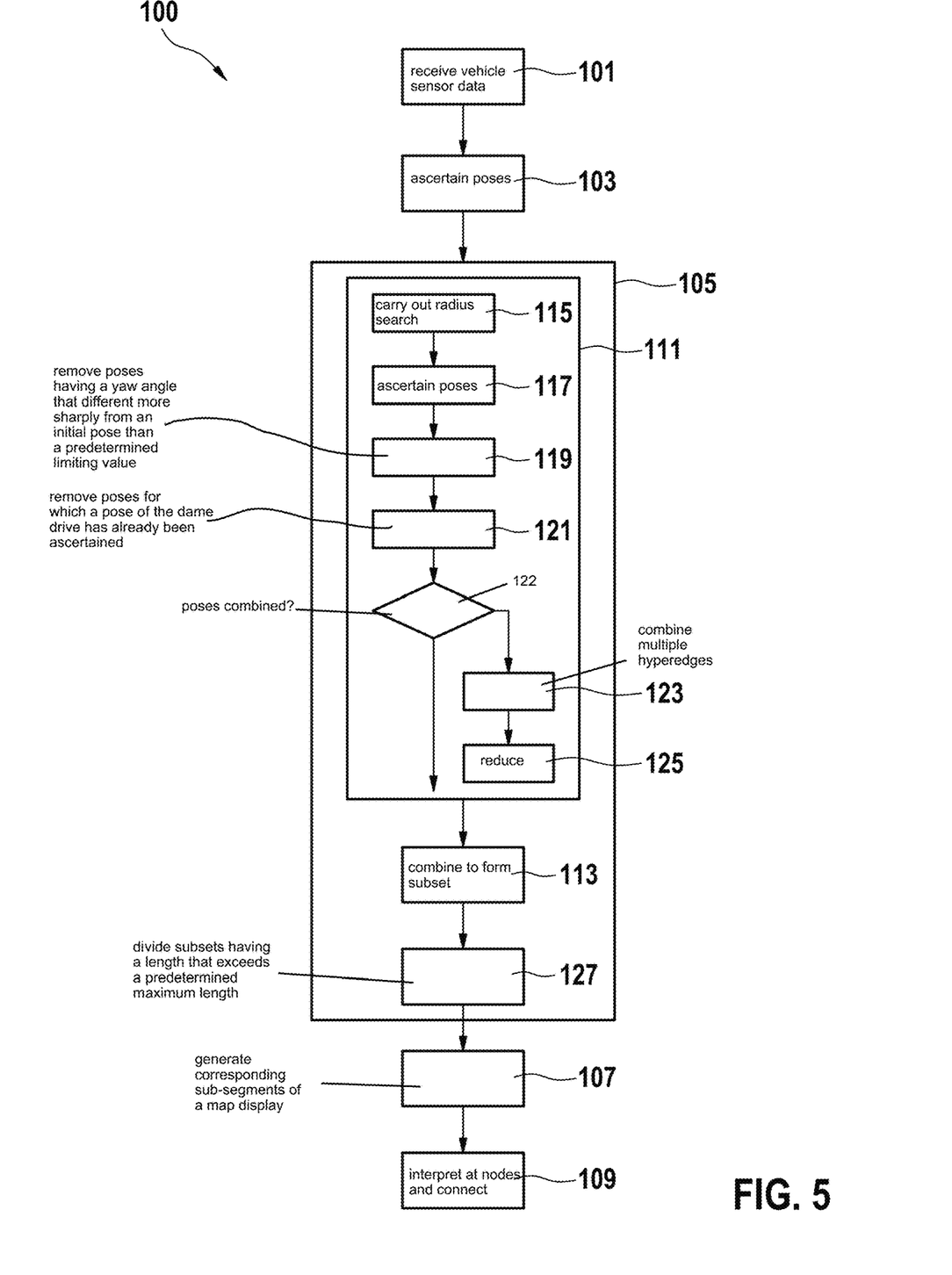
FIG. 5 shows a flowchart of the method for generating a map display for a vehicle, according to an example embodiment of the present invention.

FIG. 5 shows a flowchart of method 100 for generating a map display 200 for a vehicle 300.

According to the present invention, vehicle sensor data of a vehicle 300 or of a plurality of vehicles 300, each of which carries out a plurality of drives F along a traffic lane 305, are received in a method step 101 for generating a map display 200 according to the method 100 according to the present invention. The vehicle sensor data in this case may include surroundings sensor data of surroundings sensors and odometry data of a vehicle odometry 303 of respective vehicles 300.

In a further method step 103, poses 201 are ascertained based on the received vehicle sensor data. Poses 201 in this case describe positions and orientations of respective vehicles 300 at points in time t1 through t3 of the recording of the vehicle sensor data relative to the surroundings of vehicles 300 or to traffic lanes 305 negotiated by vehicles 300.

In a further method step 105, respectively ascertained poses 201 are combined to form subsets 211, poses 201 of a shared subset each describing a course of a shared sub-section of the route.

For this purpose, poses 201 are combined in a method step 111 to form hyperedges 203, poses 201 of a shared hyperedge 203 each having a distance A to one another, which is shorter than a predetermined maximum distance.

For this purpose, a radius search is carried out in a further method step 115 for each pose 201 of every drive F starting from respectively selected pose 201 as the initial pose.

In a further method step 117, poses 201 are ascertained in the course of the radius search, which have in each case a distance A to the initial pose that is shorter than a predetermined maximum distance.

In a further method step 119, poses 201, which have a yaw angle that differs more sharply from a yaw angle of the initial pose than a predetermined limiting value, are removed from ascertained poses 201 having a shorter distance A to the initial pose than the predetermined maximum distance.

In a further method step 121, those poses 201, for which a pose 201 of the same drive F has already been ascertained, which has a shorter or identical distance A and/or a smaller and/or identical deviation of the yaw angle, are removed from ascertained poses 201 having a shorter distance A and smaller deviation of the yaw angle to the initial pose.

It is then checked whether individual poses 201 are combined to form multiple hyperedges 203 (step 122).

If a pose 201 is combined to form multiple hyperedges 204, 205, the multiple hyperedges 204, 205 are combined in a further method step 123 to form a merged hyperedge 209.

In a subsequent method step 125, poses 201 of merged hyperedge 209 are reduced in such a way that merged hyperedge 209 includes a maximum of one pose 201 for each drive F1, F2, F3, F4, F5, F6.

Thereafter, poses 201 ascertained in such a way are combined in a method step 113 to form a subset 211, 212, 213 in such a way that for subsets 211, 212, 213 including at least one first hyperedge 209 and on second hyperedge 210, which are situated in each case one behind the other in a driving direction D of drives F, the following conditions apply:

For each pose 208 of second hyperedge 210, it is the case that no pose 201 situated immediately in front of respective pose 201 of second hyperedge 203 on the same drive in driving direction D is encompassed by a hyperedge 203 of subset 211, or that a pose 201 situated immediately in front of respective pose 201 of second hyperedge 203 on the same drive F in driving direction D is encompassed by first hyperedge 203. For each pose 201 of first hyperedge 209, it is the case that each pose 208 following immediately in driving direction D is assigned either to a hyperedge or to second hyperedge 210. For each pose 208 of second hyperedge 210, it is further the case that each pose situated immediately ahead in driving direction D is assigned either to no hyperedge or to first hyperedge 209.

In a further method step 127, subsets 211, which have a length L that exceeds a predetermined maximum length for a subset, are further divided into a plurality of subsets 211, the length L of a subset 211 being provided by a Euclidean distance between a first pose 201 and a final pose 208 of subset 211 along a driving direction D of drives F1, F2, F3, F4, F5, F6 of subset 211.

In a further method step 107, corresponding sub-segments 214 of map display 200 are generated for each subset 211, 212, 213 based on subsets 211, 212, 213 generated in such a way.

In a following method step 109, sub-segments 214 of map display 200 generated in this way are interpreted as nodes of a graph display of map display 200 and are connected to corresponding edges of the graph display.

Figure 6:
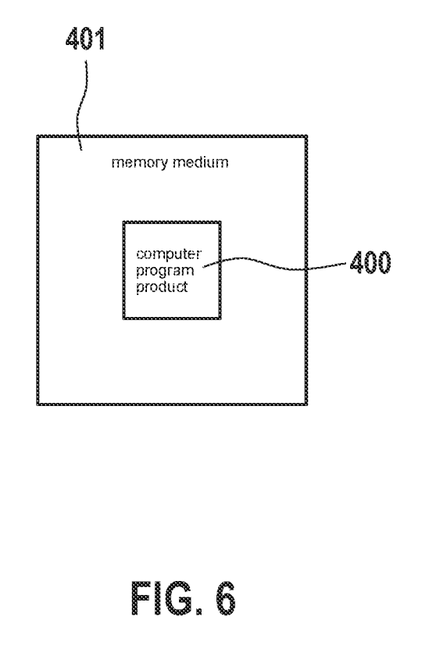
FIG. 6 schematically shows a representation of a computer program product, according to an example embodiment of the present invention.

FIG. 6 schematically shows a representation of a computer program product 400, including commands which, when the program is executed by a processing unit, prompt the program to carry out method 100 for generating a map display 200 for a vehicle 300.

Computer program product 400 is stored, in the specific embodiment shown, on a memory medium 401. Memory medium 401 in this case may be an arbitrary memory medium from the related art.

What is claimed is:

1. A method for generating a map display for a vehicle, the method comprising the following steps:
receiving vehicle sensor data, the vehicle sensor data being recorded during a plurality of drives of a vehicle or of a plurality of vehicles, the plurality of drives extending at least partially along an identical route, and the vehicle sensor data of a vehicle including odometry data of a vehicle odometry and surroundings sensor data of a surroundings sensor of the vehicle or vehicles;
ascertaining poses of the vehicle or vehicles based on the vehicle sensor data, each ascertained pose of a first vehicle of the vehicle or vehicles being assigned to one drive of the plurality of drives and describing a position and orientation of the first vehicle on a route negotiated by the first vehicle during the drive;
generating subsets of the poses by combining the poses assigned to those of the drives that have been carried out on an identical subsection of the route;
generating sub-segments of the map display based on the subsets of the poses, wherein for each subset of the subsets, a sub-segment is generated, and a course of the route within the sub-segment corresponding to the subset is ascertained based on the poses of the subset;
interpreting the sub-segments as nodes of a graph display of the map display and connecting sub-segments via edges of the graph display in such a way that subsets connected via an edge are each based on the poses of a drive.

2. The method as recited in claim 1, wherein the generation of the subsets includes:
generating hyperedges based on the poses, each hyperedge representing a set of the poses of the plurality of drives, each hyperedge of each of the drives including a maximum of one pose, and each pose of each hyperedge having a distance to each further pose of the hyperedge, which is shorter than a predefined maximum distance; and
combining a plurality of the poses of the plurality of drives to form a subset based on the hyperedges, for all poses of a first hyperedge, and of a second hyperedge of the subset situated in a driving direction of the drives of the poses of the subset behind the first hyperedge, it is the case that:
for each respective pose of the second hyperedge, it is the case that:
no pose situated immediately in front of the respective pose of the second hyperedge on the same drive in the driving direction is encompassed by a hyperedge of the subset; or a pose situated immediately in front of the respective pose of the second hyperedge on the same drive in the driving direction is encompassed by the first hyperedge; and
for each respective pose of the first hyperedge, it is the case that:
no pose situated immediately behind the respective pose of the first hyperedge on the same drive in the driving direction is encompassed by a hyperedge of the subset; or a pose situated immediately behind the respective pose (of the first hyperedge on the same drive in the driving direction is encompassed by the second hyperedge.

3. The method as recited in claim 2, wherein the generation of the hyperedges includes:
carrying out a radius search starting from an initial pose of a drive;
determining those of the poses of the plurality of drives, which have a distance shorter than a predetermined maximum distance to the initial pose;
removing poses having a distance shorter than the predetermined maximum distance to the initial pose, which have a yaw angle that deviates more sharply from a yaw angle of the initial pose than a predetermined limiting value; and
removing those of the poses of a drive for which a pose is already determined having a shorter distance than the predetermined maximum distance and smaller yaw angle than the predetermined limiting value.

4. The method as recited in claim 3, wherein the generation of hyperedges further includes:
when a pose is encompassed by multiple hyperedges:
merging the multiple hyperedges to form a merged hyperedge; and
reducing the poses of the merged hyperedge, so that only one pose is encompassed by the merged hyperedge for each of the drives.

5. The method as recited in claim 3, wherein the radius search is carried out for each pose of every drive.

6. The method as recited in claim 3, wherein the radius search takes place by implementing a k-d tree.

7. The method as recited in claim 3, wherein the distance is a Euclidean distance.

8. The method as recited in claim 1, wherein the generation of the subsets includes:
dividing those of the subsets, which have a length that exceeds a predetermined maximum length, into a plurality of subsets, the length of each subset being provided by a Euclidean distance between an initial pose and a final pose of the subset along a driving direction of the drives of the poses of the subset.

9. The method as recited in claim 1, wherein the connection of sub-segments via edges is carried out using a Union-Find data structure.

10. A processing unit configured to generate a map display for a vehicle, the processing unit configured to:
receive vehicle sensor data, the vehicle sensor data being recorded during a plurality of drives of a vehicle or of a plurality of vehicles, the plurality of drives extending at least partially along an identical route, and the vehicle sensor data of a vehicle including odometry data of a vehicle odometry and surroundings sensor data of a surroundings sensor of the vehicle or vehicles;
ascertain poses of the vehicle or vehicles based on the vehicle sensor data, each ascertained pose of a first vehicle of the vehicle or vehicles being assigned to one of the plurality of drives and describing a position and orientation of the first vehicle on a route negotiated by the first vehicle during the drive;
generate subsets of the poses by combining the poses assigned to those of the drives that have been carried out on an identical subsection of the route;
generate sub-segments of the map display based on the subsets of the poses, wherein for each subset of the subsets, a sub-segment is generated, and a course of the route within the sub-segment corresponding to the subset is ascertained based on the poses of the subset;
interpret the sub-segments as nodes of a graph display of the map display and connect sub-segments via edges of the graph display in such a way that subsets connected via an edge are each based on the poses of a drive.

11. A non-transitory memory medium on which is stored a computer program including commands for generating a map display for a vehicle, the commands, when executed by a data processor, causing the data processor to perform the following steps:
receiving vehicle sensor data, the vehicle sensor data being recorded during a plurality of drives of a vehicle or of a plurality of vehicles, the plurality of drives extending at least partially along an identical route, and the vehicle sensor data of a vehicle including odometry data of a vehicle odometry and surroundings sensor data of a surroundings sensor of the vehicle or vehicles;
ascertaining poses of the vehicle or vehicles based on the vehicle sensor data, each ascertained pose of a first vehicle of the vehicle or vehicles being assigned to one of the plurality of drives and describing a position and orientation of the first vehicle on a route negotiated by the first vehicle during the drive;
generating subsets of the poses by combining the poses assigned to those of the drives that have been carried out on an identical subsection of the route;
generating sub-segments of the map display based on the subsets of the poses, wherein for each subset of the subsets, a sub-segment is generated, and a course of the route within the sub-segment corresponding to the subset is ascertained based on the poses of the subset;
interpreting the sub-segments as nodes of a graph display of the map display and connecting sub-segments via edges of the graph display in such a way that subsets connected via an edge are each based on the poses of a drive.

* * * * *